United States Patent Office 2,726,243
Patented Dec. 6, 1955

2,726,243
HYDRAZIDES OF YOHIMBIC ACID

Charles F. Huebner, Chatham, N. J., assignor to Ciba Pharmaceutical Products, Inc., Summit, N. J., a corporation of New Jersey No Drawing. Application January 8, 1954,
Serial No. 403,063

6 Claims. (Cl. 260—287)

The present invention relates to the preparation of novel derivatives of yohimbic acid, and more particularly yohimbic acid hydrazides, for example, the hydrazide of yohimbic acid and various derivatives thereof, for instance carbamylhydrazides of yohimbic acid, alkylidene hydrazides of yohimbic acid, and acylated hydrazides of yohimbic acid.

The novel hydrazides, and especially the hydrazide and the carbamylhydrazide of yohimbic acid, are useful as adrenolytic and hypotensive agents. These compounds exhibit both activities, but unlike yohimbine are free from the side effects such as central stimulation and convulsive action exhibited by yohimbine.

The novel hydrazides can be made by various methods. Thus, for example, yohimbic acid or a functional derivative thereof, as for instance an ester of yohimbic acid or the acyl chloride, can be reacted with hydrazine or an appropriately substituted hydrazine, for example, a carbamylhydrazine, acylhydrazine, or alkylidine hydrazine to produce the desired hydrazide of yohimbic acid. In an alternative procedure yohimbic acid or a functional derivative thereof can be reacted with hydrazine, and the hydrazide of yohimbic acid thus obtained then treated with a reagent which introduces the desired substituent in the hydrazide radical, e. g., a cyanate, an isothiocyanate, an aldehyde or a ketone, or an acid halide or anhydride, to form the corresponding carbamyl-, thiocarbamyl-, alkylidene-, and acylhydrazides of yohimbic acid. Thus, for example, when reacting yohimbic acid hydrazide with hydrogen cyanate, and hydrogen thiocyanate, the corresponding carbamylhydrazide and thiocarbamylhydrazide of yohimbic acid are obtained. By employing organic isocyanates and isothiocyanates the corresponding carbamylhydrazides and thiocarbamylhydrazides of yohimbic acid can be produced. When yohimbic acid hydrazide is reacted with an aldehyde or a ketone, for example, aliphatic, araliphatic or aromatic aldehydes and ketones, the corresponding idene-compounds, for example, alkylidene, aralkylidene and arylidene hydrazides of yohimbic acid are produced. When an acid anhydride or the corresponding acyl halide is reacted with yohimbic acid hydrazide the corresponding acylhydrazides of yohimbic acid are obtained.

The compounds can be obtained in the form of free bases or as acid addition salts, for example, the hydrohalides, sulfates, nitrates and the like. The present invention embraces the compounds in the form of the free bases and also their salts.

The following examples will serve to illustrate the invention, the parts by weight bearing the same relationship to the parts by volume as the gram to the milliliter:

Example 1

5 parts by weight of yohimbine, M. P. 232–234° C., are refluxed in 25 parts by volume of methanol with 5 parts by volume of hydrazine for 96 hours. 100 parts by volume of water are then added whereupon the hydrazide of yohimbic acid separates. The compound crystallizes as a hydrate melting at 100° C. and can be recrystallized from methanol-water. When dried in vacuo at 100° C. the water of crystallization is removed and the hydrazide of yohimbic acid thus obtained melts at 175–180° C. with decomposition. The hydrochloride is prepared by adding 8 N ethanolic hydrogen chloride to a solution of the hydrazide of yohimbic acid in a minimum of ethanol. On the slow addition of ether the hydrochloride of the hydrazide of yohimbic acid precipitates and is obtained as an amorphous powder M. P. 230–237° C. with decomposition. Other salts, e. g., the hydrobromide, nitrate and sulphate can be produced in the same way.

Example 2

2 parts by weight of the hydrazide of yohimbic acid are dissolved in 50 parts by volume of 0.4 N aqueous hydrochloric acid. A solution of 0.5 part by weight of potassium cyanate in 5 parts by volume of water are then added. After standing for 15 minutes the solution is made basic with ammonia, whereupon the carbamylhydrazide of yohimbic acid separates. On recrystallization from methanol-water the compound melts at 200–210° C. with decomposition.

Example 3

1.68 parts by volume of phenylisothiocyanate is added to a solution of 5 parts by weight of the hydrazide of yohimbic acid in 50 parts by volume of ethanol. After three hours, water is added to precipitate the phenylthiocarbamylhydrazide of yohimbic acid. On treatment of this compound with ethanolic hydrogen chloride in the same manner as described in Example 1, there is obtained yohimbic acid phenylthiocarbamylhydrazide hydrochloride, melting at 299–303° C. with decomposition. The hydrobromide, nitrate and sulphate and other salts can be prepared in the same way.

By employing an alkyl or aryl isocyanate or isothiocyanate such as methyl, ethyl or phenyl isocyanate or isothiocyanates the corresponding alkyl carbamyl- and thiocarbamylhydrazides of yohimbic acid are obtained.

When the hydrazide of yohimbic acid is reacted with an aldehyde or ketone, for example, acetaldehyde or acetone, the corresponding alkylidene hydrazide of yohimbic acid is produced. When the hydrazide of yohimbic acid is reacted with an acid anhydride, for example, acetic anhydride the corresponding acetyl hydrazide of yohimbic acid results.

The novel compounds can be administered in any suitable unit dosage form, either parenterally or per orally.

I claim:
1. Hydrazides of yohimbic acid.
2. The hydrazide of yohimbic acid.
3. Carbamylhydrazides of yohimbic acid.
4. Thiocarbamylhydrazides of yohimbic acid.
5. Carbamylhydrazide of yohimbic acid.
6. Phenylthiocarbamylhydrazide of yohimbic acid.

References Cited in the file of this patent

Curtius: Berichte, vol. 31 (1898), page 2493.
Yale et al.: J. Am. Chem. Soc., vol 75, pp. 1933–42, Apr. 20, 1953.